(12) United States Patent
Dixon

(10) Patent No.: US 7,856,716 B2
(45) Date of Patent: Dec. 28, 2010

(54) METHOD FOR ASSEMBLING A PLURALITY OF TUBES TO A TUBESHEET

(75) Inventor: Matthew A Dixon, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 1190 days.

(21) Appl. No.: 11/459,846

(22) Filed: Jul. 25, 2006

(65) Prior Publication Data

US 2007/0039181 A1  Feb. 22, 2007

Related U.S. Application Data

(60) Provisional application No. 60/705,998, filed on Aug. 5, 2005.

(51) Int. Cl.
*B21D 51/24* (2006.01)
(52) U.S. Cl. .................... 29/890.051; 29/890.047; 29/890.043; 29/890.038; 29/890.045; 29/890.04; 165/178; 165/DIG. 492
(58) Field of Classification Search .......... 29/890.047, 29/890.043, 890.038, 890.45, 890.051, 890.04, 29/33 G, 564.6, 523, 727; 165/80.3, 173, 165/149, DIG. 492, 175, 178
See application file for complete search history.

(56) References Cited

U.S. PATENT DOCUMENTS

| 1,742,414 A | * | 1/1930 | Rogers ............... 29/890.04 |
| 3,789,479 A | | 2/1974 | Zifferer |
| 4,405,012 A | | 9/1983 | Mach |
| 4,607,423 A | | 8/1986 | Sleep, Jr. |
| 4,839,950 A | * | 6/1989 | Stroup ............... 29/890.047 |
| 5,442,853 A | | 8/1995 | Kroger et al. |
| 6,138,747 A | | 10/2000 | Kroger et al. |

FOREIGN PATENT DOCUMENTS

JP          01034623 A      6/1998

* cited by examiner

*Primary Examiner*—Rick K Chang
(74) *Attorney, Agent, or Firm*—Locke Lord Bissell & Liddell LLP

(57) ABSTRACT

A method for assembling a plurality of tubes to a tubesheet. A first end of each of the tubes is situated over a corresponding support rod that extends from a pattern block of the fixture. A first end of a plurality of locating members is inserted into a second end of each of the tubes such that a second end of the locating member extends from the tube second end. The tubesheet is then slid over the locating members and tubes such that each of a plurality of holes in the tubesheet receive corresponding ones of the tubes.

12 Claims, 3 Drawing Sheets

METHOD FOR ASSEMBLING A PLURALITY OF TUBES TO A TUBESHEET

CROSS-REFERENCE TO RELATED APPLICATION

This application is a non-provisional application of U.S. Provisional Application No. 60/705,998, filed on Aug. 5, 2005, which is incorporated by reference.

BACKGROUND

The present invention relates generally to cooling systems, and more specifically to shell and tube condensers.

Shell and tube condensers typically have a plurality of tubes situated inside a cylindrically-shaped outer shell. The ends of the tubes terminate in openings defined in an end plate or "tubesheet" at each end of the shell. Opposite ends of the tubes are open for directing a flow of fluid through the tubes. Known assembling processes for shell and tube condensers have been problematic. For instance, it can be difficult to keep the tubes aligned when inserting them in the shell and tubesheet. In other instances, if the tubes are inserted into the tubesheet one at a time, it is possible for a tube to be inserted into the wrong opening in one of the tubesheets. Locating the proper opening in the tubesheets can be difficult due to the close proximity of the openings and the tight tolerance of the concentric fits.

The present application addresses shortcomings associated with the prior art.

SUMMARY

In accordance with certain teachings of the present disclosure, a method for assembling a plurality of tubes to a tubesheet includes situating a first end of each of the tubes over a corresponding support rod that extends from a pattern block. A first end of a plurality of locating members is inserted into a second end of each of the tubes such that a second end of the locating member extends from the tube second end. The tubesheet is slid over the locating members and tubes such that each of a plurality of holes in the tubesheet receive corresponding ones of the tubes. Typically, two tubesheets are connected to opposite ends of a shell, so the assembled tubesheets and shell are slid over the locating members and tubes.

The locating members may then be removed from the second end of the tubes. The second ends of the tubes are expanded to attach the tubes to the tubesheet. The assembly is then removed from the support rods and the remaining ends of the tubes are expanded to attach them to the tubesheet at the opposite end of the shell. In some embodiments, the support rods are removable from the pattern block. The locating members have a first end that is receivable by the corresponding support rod, and a tapered second end that facilitates the proper tube being received by the corresponding hole in the tubesheet.

BRIEF DESCRIPTION OF THE DRAWINGS

Other objects and advantages of the invention will become apparent upon reading the following detailed description and upon reference to the drawings in which.

Figure 1:
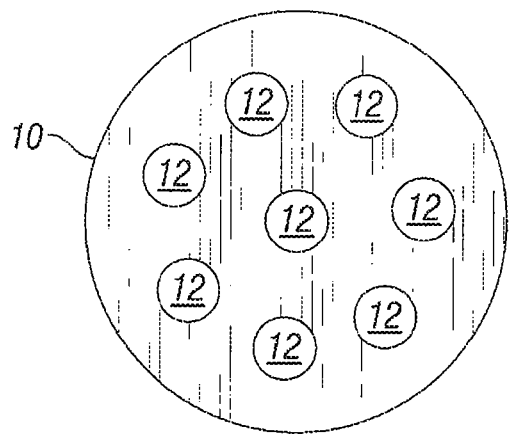
FIG. 1 illustrates a typical tubesheet.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates a typical tubesheet for a shell and tube condenser. In the illustrated tubesheet 10, eight holes 12 are defined for receiving the condenser tubes. Depending on the construction of the condenser, any number of tubes and tube patterns could be used. The condenser tubes are received in the openings 12 of the tubesheet 10 and the tubes are expanded to fix them to the tubesheet 10.

Figure 2:
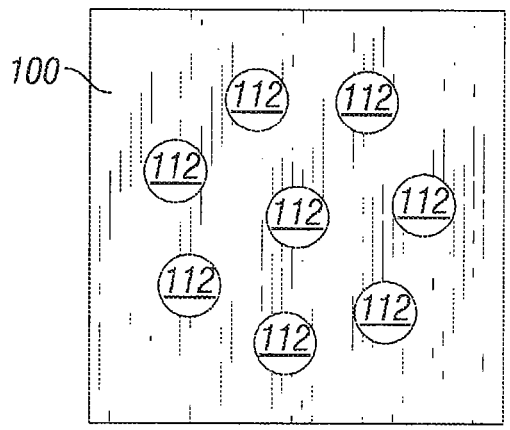
FIG. 2 schematically illustrates a front view of a pattern block in accordance with the present disclosure.
Figure 3:
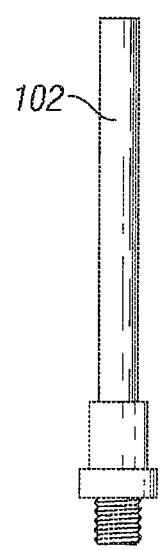
FIG. 3 schematically illustrates a support rod in accordance with the present disclosure.
Figure 4:
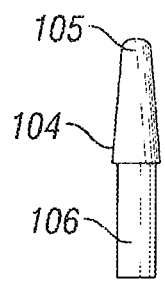
FIG. 4 schematically illustrates a locating member in accordance with the present disclosure.

FIGS. 2-4 illustrate three components of a fixture for facilitating the assembly of a shell and tube device in accordance with aspects of the present disclosure. The fixture includes a pattern block 100, shown in FIG. 2, a support rod 102 (FIG. 3) and a tapered locating member, or "bullet" 104 (FIG. 4). The particular pattern block 100 shown in FIG. 2 defines eight holes 112 corresponding to the holes 12 of the tubesheet 10. The holes 12 may be threaded to receive a threaded end of the support rods 102. The number and pattern of the holes 112 will of course vary depending on the configuration of the particular tubesheet being used.

Figure 5:
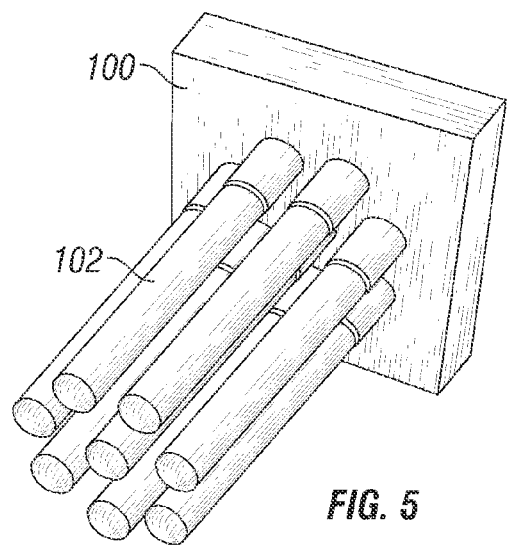
FIG. 5 is a perspective view of the support rods assembled to the mounting plate.
Figure 6:
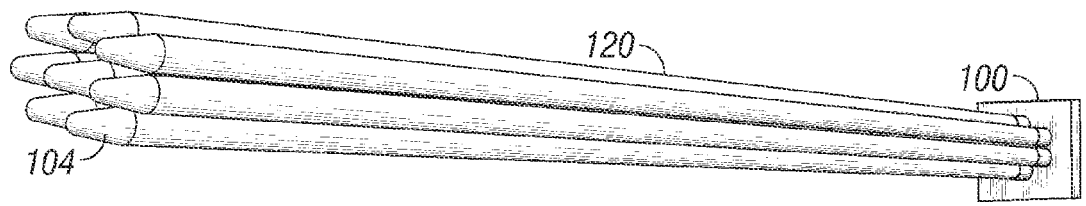
FIG. 6 is a perspective view showing tubes situated over the support rods with locating members inserted into the ends of the tubes.

Initially, the pattern block 100 and the support rods 102 are assembled as shown in FIG. 5. To assemble the shell and tube device, one end of each of the condenser tubes 120 is placed over a corresponding one of the support rods 102 as shown in FIG. 6, leaving the opposite end of the tubes 120 free. The support rods 102 extending from the pattern block 100 allow multiple tubes 120 to be placed over the support rods 102 simultaneously. Once the tubes 120 are in place, the bullets 104 are inserted into the ends of the tubes 120 opposite the pattern block 102. As shown in FIG. 4, the bullets 104 have one end 105 that is tapered. The opposite end 106 of the bullet 104 is sized such that it can be inserted into the tube 120 with the tapered end 105 extending therefrom. The tapered end 105 allows easier placement of the holes of the tubesheets 124 over the appropriate tube 120.

Figure 7:
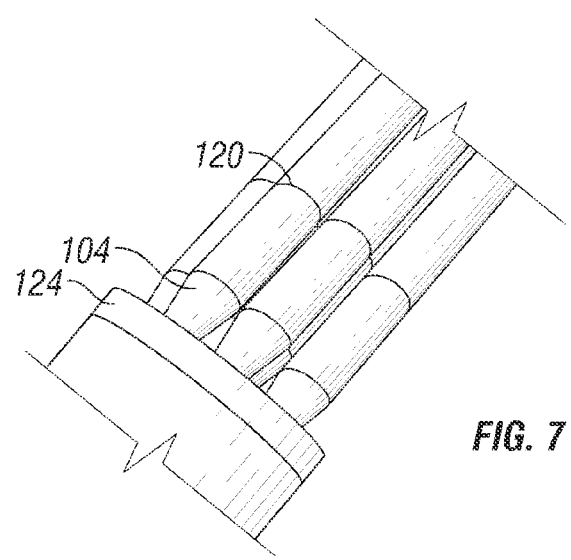
FIGS. 7-10 are various views showing the shell and tubesheet being situated over the locating members and tubes.
Figure 8:
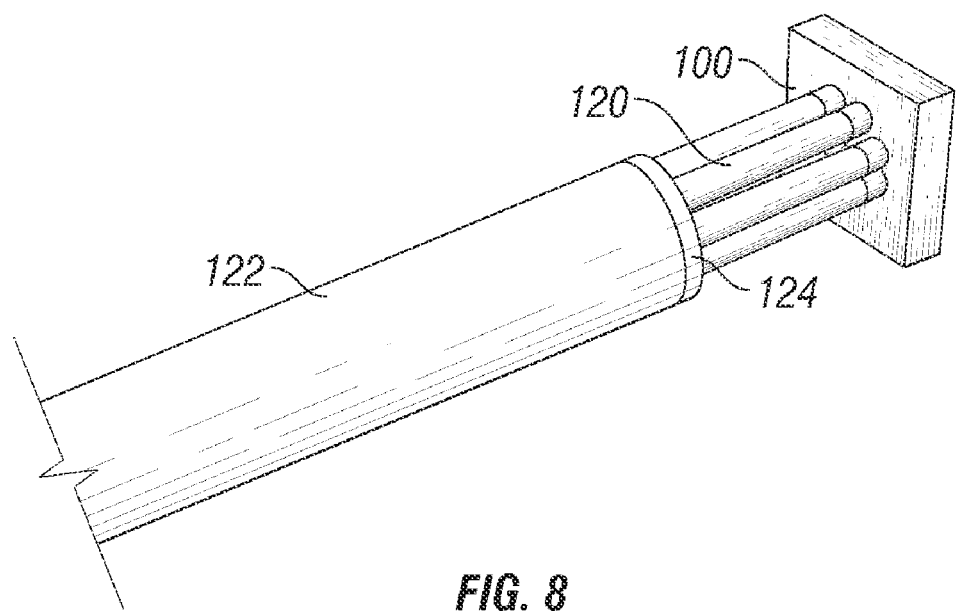
Figure 9:
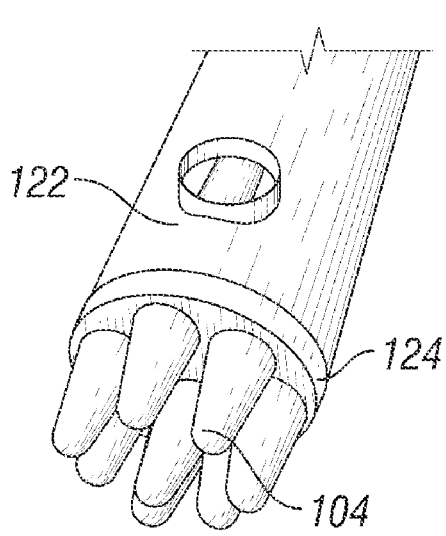

After the bullets 104 are inserted into the tubes 120, the shell 122 and tubesheet 124 are placed over the tubes 120 as shown in FIGS. 7, 8 and 9. In the illustrated assembly, the shell 122 has a tubesheet 124 at either end of the shell 122. In FIG. 7, the tapered ends of the bullets 104 receive the corresponding holes of the first tubesheet 124 at one end of the shell 122. The first tubesheet 124 is slid down the length of the tubes 120, as shown in FIG. 8, until the tubesheet 124 reaches the end of the tubes 120 being supported by the support rods 102 extending from the pattern block 100. When the second tubesheet 124 at the end of the tubes 120 opposite the pattern block 100 reaches the bullets 104, the holes of the second tubesheet 124 receive the tapered end of the corresponding bullet 104 to facilitate situating the second tubesheet 124 about the tubes 120.

Figure 10:
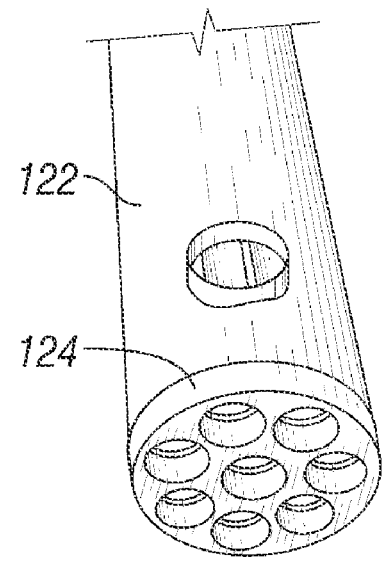

Once the shell 122 and tubesheets 124 are in place, the bullets 104 are removed as shown in FIG. 10. The ends of the tubes 120 opposite the pattern block 100 are expanded to fix the ends of the tubes 120 in the holes of the tubesheet 124. The assembled tubes 120, shell 122 and tubesheets 124 are removed from the support rods 102 of the fixture, and the remaining ends of the tubes 120 are expanded to attach them to the tubesheet 124 at the opposite end of the shell 122.

As illustrated herein, the support rods 102 are received by the pattern block 100 such that the support rods 102 are oriented generally horizontally. However, the combined pattern block 100 and support rods 102 can be used with the rods oriented in other manners, such as vertically. Moreover, the number, size, pattern, etc. of the holes 112 in the pattern block 100 can be varied as necessary to support the associated shell and tube assembly.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Consequently, all such similar applications are considered within the scope and spirit of the invention. Accordingly, the protection sought herein is as set forth in the claims below.

What is claimed is:

1. A method for assembling a plurality of tubes to a tubesheet, the method comprising the steps of:
    situating a first end of each of the tubes over a corresponding support rod that extends from a pattern block;
    inserting a first end of a plurality of locating members into a second end of each of the tubes such that a second end of each locating member extends from a corresponding tube second end;
    connecting a first tubesheet to a first end of a shell;
    connecting a second tubesheet to a second end of the cylindrical shell; and
    subsequently sliding the first and second tubesheets and shell over the locating members and tubes such that each of the tubes is received by a corresponding hole in each of the first and second tubesheets, and the first and second tubesheets are situated at the first and second ends of the tubes, respectively.

2. The method of claim 1, further comprising removing the locating members from the second ends of the tubes.

3. The method of claim 1, further comprising attaching the tubes to the first tubesheet.

4. The method of claim 3, wherein attaching the tubes to the first tubesheet includes expanding the tubes.

5. The method of claim 1, further comprising attaching the second tubesheet to the second ends of the tubes.

6. The method of claim 5, wherein attaching the second tubesheet includes expanding the second ends of the tubes.

7. The method of claim 5, further comprising removing the tubes from the support rods.

8. The method of claim 7, further comprising attaching the first tubesheet to the first ends of the tubes.

9. The method of claim 8, wherein attaching the first tubesheet includes expanding the first ends of the tubes.

10. The method of claim 1, further comprising attaching the support rods to the pattern block.

11. The method of claim 1, further comprising locating at least one of the corresponding holes with the second end of a locating member.

12. The method of claim 1, further comprising supporting at least one tube in a position for assembly using only a corresponding support rod.

* * * * *